(12) United States Patent
Tsui et al.

(10) Patent No.: US 7,440,989 B1
(45) Date of Patent: Oct. 21, 2008

(54) KERNEL FUNCTION APPROXIMATION AND RECEIVER

(75) Inventors: James B. Y. Tsui, Dayton, OH (US); John M. Emmert, Dayton, OH (US); Stephen L. Hary, Dayton, OH (US); David M. Lin, Beavercreek, OH (US); Nicholas A. Pequignot, Dayton, OH (US); Keith M. Graves, Springfield, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 760 days.

(21) Appl. No.: 10/816,353

(22) Filed: Apr. 2, 2004

(51) Int. Cl.
*G06F 15/00* (2006.01)

(52) U.S. Cl. ...................................... 708/403

(58) Field of Classification Search .......... 708/400–409
See application file for complete search history.

(56) References Cited

U.S. PATENT DOCUMENTS

| | | | |
|---|---|---|---|
| 3,730,425 A | 5/1973 | Kindell et al. | |
| 4,064,400 A | 12/1977 | Akushsky et al. | |
| 5,233,551 A * | 8/1993 | White | 708/408 |
| 5,793,323 A | 8/1998 | Tsui | |
| 5,903,483 A | 5/1999 | Bond et al. | |
| 5,917,737 A | 6/1999 | Tsui et al. | |
| 5,963,164 A | 10/1999 | Tsui et al. | |
| 6,310,575 B1 | 10/2001 | Chabah et al. | |
| 6,448,921 B1 | 9/2002 | Tsui et al. | |
| 6,531,976 B1 | 3/2003 | Yu | |
| 6,690,315 B1 | 2/2004 | Schamus et al. | |
| 6,757,326 B1 * | 6/2004 | Prieto et al. | 708/400 |
| 2003/0038742 A1 | 2/2003 | Greer | |

OTHER PUBLICATIONS

James et al., Digital Microwave Receiver Technology, Mar. 2002, IEEE Transactions on Microwave Theory and Techniques, vol. 50, No. 3, pp. 699-705.*

* cited by examiner

*Primary Examiner*—Chat C Do
(74) *Attorney, Agent, or Firm*—AFMCLO/JAZ; Gerald B. Hollins (57) ABSTRACT

A Fourier transformation arrangement usable in an electronic warfare radio receiver for analyzing spectral content of multiple transmitter-sourced brief duration incoming signals for their signal characteristics. The disclosed Fourier transformation arrangement includes approximated Kernel function values disposed in a significant plurality of locations about a real-imaginary coordinate axis origin according to disclosed locating principles. The points are displaced from the origin by magnitudes having real and imaginary component lengths of powers of two commencing with zero. Multiplication involving a power of two component length during a Kernel function utilization are preferably achieved by way of an expanded binary shift multiplication algorithm in lieu of a full fledged digital multiplication algorithm. A group of guiding principles for selecting desirable approximation Kernel function locations is included.

18 Claims, 5 Drawing Sheets

$O_1 = I_1 + \alpha \bullet I_2$ $O_2 = I_2 - \alpha \bullet I_2$

KERNEL FUNCTION APPROXIMATION AND RECEIVER

RIGHTS OF THE GOVERNMENT

The invention described herein may be manufactured and used by or for the Government of the United States for all governmental purposes without the payment of any royalty.

BACKGROUND OF THE INVENTION

In a series of previous issued and pending U.S. Patent documents inventors named in connection with the present document and various groupings of their colleagues have disclosed a family of electronic warfare radio receivers that are usable in obtaining military and otherwise useful information from an incoming microwave frequency radio signal and have also disclosed significant components of such receivers. Early in this sequence of patent documents the name "monobit receiver" was used in referring to both one embodiment of such a receiver and subsequently as a generic or family name for such receivers. Each of these receivers as preferably embodied is of a wide band nature and employs the Fourier transformation as a tool for identifying characteristics of the incoming radio frequency signal. Additionally each of these receivers has the attribute of employing a simplified multiplication arrangement in making use of the Fourier transformation results in order that a simple and low cost realization of the receiver can be achieved.

In each of these simplified multiplications the Kernel function portion of the Fourier transformation is represented by a unit value, a magnitude of one or near one, in order to avoid the mechanization complexity of full fledged multiplication algorithm during the receiver step when complex numbers representing an input signal are multiplied by a second set of complex numbers representing the Fourier transformation Kernel function. Generally these simplified multiplications have in the past been accomplished by insuring the second set of complex numbers, i.e., the Fourier transformation results, involve real and imaginary values of unity or near unity. As implied by the name "monobit receiver" the earliest of these simplified Kernel function receivers employs a Kernel function approximation representable by a single binary bit of information while the later versions of the receiver and indeed the present invention involve Kernel function arrangements requiring a greater number of bits, i.e., three or four bits. In view of these greater numbers of bits it is of course necessary to accomplish an actual multiplication operation involving the Fourier transformation results however for feasibility purposes some form of simplified and readily accomplished multiplication is needed.

In order to better appreciate the present invention it may be helpful to regress briefly and consider the evolution of simplified Kernel function realizations in our work. Such evolution commences with the realization of a Fourier transformation using only multiplication by unity or in essence no multiplication in the Fourier transformation computation algorithm. Kernel function realization in this manner is first disclosed in a U.S. patent of Tsui et al., a patent numbered U.S. Pat. No. 5,917,737, a patent wherein Kernel function values are located on a circle of unit radius at angular locations of $5/4$, $3 5/4$, $5 5/4$ and $7 5/4$ radians i.e., at locations displaced by forty five degrees from the real and imaginary axes of a coordinate axis plot. Actual coordinate axis locations of 1+j, 1−j, −1+j and −1+j are used for the Kernel functions disclosed in the U.S. Pat. No. 5,917,737 patent. For reference simplification purposes this and the several other patents issued to various combinations of persons from our laboratory are herein referred-to as "our patent" notwithstanding the differing group of inventors, with perhaps one common inventor, associated with each patent.

Our U.S. Pat. No. 5,793,323 therefore relates to the U.S. Pat. No. 5,917,737 patent in that it discloses a single integrated circuit chip arrangement for a monobit receiver employing the approximated Kernel function of the U.S. Pat. No. 5,917,737 patent. This patent also discloses several implementation compromises possible in applying the simplified Kernel function to receiver apparatus and provides a receiver that can cover a one gigahertz spectrum with a frequency resolution of 9.77 megahertz.

Our U.S. patent application Ser. No. 09/917,589 filed on Jul. 30, 2001 also relates to the U.S. Pat. No. 5,917,737 patent in that it discloses the use of a monobit receiver in combination with several bandpass filters in order to increase the number of simultaneously processable signals and enhance the dynamic range capability of the overall system.

The invention of our U.S. patent application Ser. No. 09/944,616, filed on Sep. 4, 2001, provides a straightforward approach to the enhancement of dynamic range in a monobit family receiver by increasing the number of Kernel function locations used in the Kernel function approximation from the four locations of the U.S. Pat. No. 5,917,737 patent and the U.S. Pat. No. 5,963,164 patent to eight locations. In the application of Ser. No. 09/944,616 Kernel function values located at the $5/4$, $3 5/4$, $5 5/4$ and $7 5/4$ radian locations are added to the Kernel function values at $0$, $5/2$, $5$, and $3 5/2$ radians with the added four values being slightly increased in magnitude from true unit circle values and in fact having a magnitude of $(2)^{1/2}$ or 1.414. Some of these eight location Kernel function values depart slightly from unity magnitude however the overall results of the eight-location Kernel function appear favorable.

Additional of our U.S. Patent and Trademark Office documents involving Kernel function realizations include the application of Ser. No. 10/115,819, filed on Apr. 3, 2002, and now issued as Statutory Invention Registration H2109. This document is titled "PASSIVE MICROWAVE DIRECTION FINDING WITH MONOBIT FOURIER TRANSFORMATION RECEIVER AND MATRIX COUPLED ANTENNA".

In addition to these previous patent documents wherein use of a Kernel function realization of unity or near unity value is employed in order to achieve a simplified multiplication operation the U.S. patent application Ser. No. 10/354,267, filed on Jan. 31, 2003, discloses an electronic warfare receiver wherein a Kernel function realization of other than unity magnitude is used in combination with a simplified multiplication arrangement accomplished with a bit shifting multiplication algorithm. In the of Ser. No. 10/354,267, document the simplified bit shifting algorithm multiplication can be implemented with such minimal complexity and cost as to make the non-unity magnitude of the Kernel function of little consequence. The present invention may be considered as an extension of this simplification multiplication through shifting concept.

The present invention may also start with the initial realization that a significant difficulty with the monobit electronic warfare receiver results form the fact that the two signal instantaneous dynamic range achieved in such a receiver is undesirably low. The instantaneous dynamic range relates to the receiver's capability to detect two simultaneous signals of different amplitude and can be an important consideration in a receiver use situation especially when a hostile adversary is involved. Because of the non-linear property of the approximated Kernel function in the Tsui et al. U.S. Pat. No. 5,917,737 patent receiver, the two signal instantaneous dynamic range of this receiver is limited to about 2 dB. Using a different Kernel function in the later tribit receiver of the Ser. No. 09/944,616 application can improve this instantaneous dynamic range to about 10 dB. A receiver arrangement according to the present invention can further improve this dynamic range characteristic. Each of the patent documents, issued or pending, identified in this BACKGROUND OF THE INVENTION DISCUSSION is hereby incorporated by reference herein.

The present patent document continues in this line of Kernel function and Kernel function receiver patents and thus provides additional insight into the simplified Kernel function utilization art. In the present invention additional improvement of the dynamic range achieved in the monobit family of receivers is pursued while relaxing the previously perceived need to limit multiplications to unity magnitude values.

SUMMARY OF THE INVENTION

The present invention provides for improved instantaneous dynamic range in the Fourier transformation inclusive electronic warfare radio receiver by way of disclosing a more accurate approximated Fourier transformation and utilization of this more accurate transformation in a relaxed multiplication algorithm.

It is therefore an object of the present invention to provide electronic warfare receivers having improved dynamic range characteristics.

It is another object of the invention to provide additionally improved approximations of the Kernel function used in an electronic warfare receiver.

It is another object of the invention to provide an increased number of Kernel function magnitudes usable in an approximated Kernel function simplified multiplication electronic warfare receiver.

It is another object of the invention to provide an approximated Kernel function that is not limited to 32 or fewer values.

It is another object of the invention to provide an approximated Kernel function that may include a number of Kernel function approximations determined by the capability of the related analog-to-digital converter apparatus.

It is another object of the invention to provide an N point approximated Kernel function usable with simplified forms of mathematical multiplication in an electronic warfare receiver.

It is another object of the invention to provide a new set of approximated Kernel function values that are made useful by an increased reliance on the binary shift multiplication algorithm.

It is another object of the invention to provide a new set of approximated Kernel function values that are made useful by reliance on a binary shift multiplication algorithm having shift, multiple shift and multiple shift with supplemental addition or subtraction operation steps.

It is another object of the invention to provide a new set of approximated Kernel function values optimized with respect to multiple aspects of a Fourier transformation operation.

It is another object of the invention to provide a new set of approximated Kernel function values optimized with respect to multiple aspects of a Fourier transformation operation including minimal spurious response output of the Fourier transformation and maximized convenience in performing Fourier transformation required multiplication operations.

These and other objects of the invention will become apparent as the description of the representative embodiments proceeds.

These and other objects of the invention are achieved by the limited mechanization complexity method of analyzing input radio frequency signals, said method comprising the steps of:

generating an approximation Fourier transformation of successive segments of said input radio frequency signals;

said approximation Fourier transformation segments including individual Fourier series terms having real magnitude and imaginary magnitude coefficients generated by multiplication of input signal determined coefficients by selected approximated Fourier transformation Kernel function coefficients;

said selected approximated Fourier transformation Kernel function coefficients including both integral unit and integral multiple unit possible component magnitudes over a real and imaginary value complex plane grid and defining a circular trajectory Kernel function location pattern over said real and imaginary value complex plane grid;

said selected approximated Fourier transformation Kernel function locations being dispersed in substantially equal angular increments around said defined circular trajectory Kernel function location pattern on said real and imaginary value complex plane grid;

generating said individual Fourier series terms from said input signal determined coefficients and from said Fourier transformation Kernel function coefficients having real magnitude and imaginary magnitude coefficients using a bit shift multiplication algorithm inclusive of multiple shift and add/subtract algorithm components;

said selected approximated Fourier transformation Kernel function locations being dispersed in an annular space inclusive of said circular trajectory on said real and imaginary value complex plane grid and being optimized with respect to including integral numeric values compatible with said bit shift multiplication algorithm having multiple shift and add/subtract algorithm components.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

The approximated Kernel function for the first of the above-identified patents, the four valued Kernel function of the U.S. Pat. No. 5,917,737 patent of Tsui et al., is shown in graphic representation in the FIG. 1 drawing herein. The monobit receiver using this Kernel function employs a single bit concept in the discrete Fourier transform (DFT) of the receiver in order to achieve multiplication by unity and eliminate a multiplication algorithm realization in the receiver's implementation. A receiver according to this arrangement has in fact been implemented and fabricated in an application specific integrated circuit (ASIC) chip in applicants' laboratory. The performance of a receiver of this arrangement has thus been successfully demonstrated. This single chip receiver covers an instantaneous bandwidth of 1.25 GHz and performs a 256-point DFT every 102.4 ns. This ASIC chip additionally includes arbitration logic and determines the number of input signals and their frequencies. The encoding logic of the receiver identifies the highest two amplitudes from a total of 128 (256/2) frequency outputs. The use of a 256 point DFT in this receiver and chip is determined by the state of the art in realizing an analog to digital conversion operation, such present day electronic hardware limitations are regarded as being of a temporary nature so that the present invention need not be considered as correspondingly limited. The circle 100 in FIG. 1 and the similar circles in FIG. 2 through FIG. 5 herein may be referred-to as Kernel function map circles or more simply as Kernel function circles for convenience.

As indicated above however the dynamic range of this monobit receiver is undesirably limited to two-signal signal situations involving signal strength differences in the range of two decibels. This two signal dynamic range limitation (herein referred-to by the term "dynamic range") can be primarily attributed to the non-linear property of the Kernel function realization. In some receiver applications of course this limited dynamic range is acceptable and use of the single chip monobit receiver is thus desirable. One of the major efforts we expend toward improving the performance of the monobit receiver is however directed to increasing the instantaneous dynamic range of the receiver. From these efforts the concept of a quadbit receiver has been proposed; this receiver can improve the instantaneous dynamic range to about 11 dB.

Figure 1:
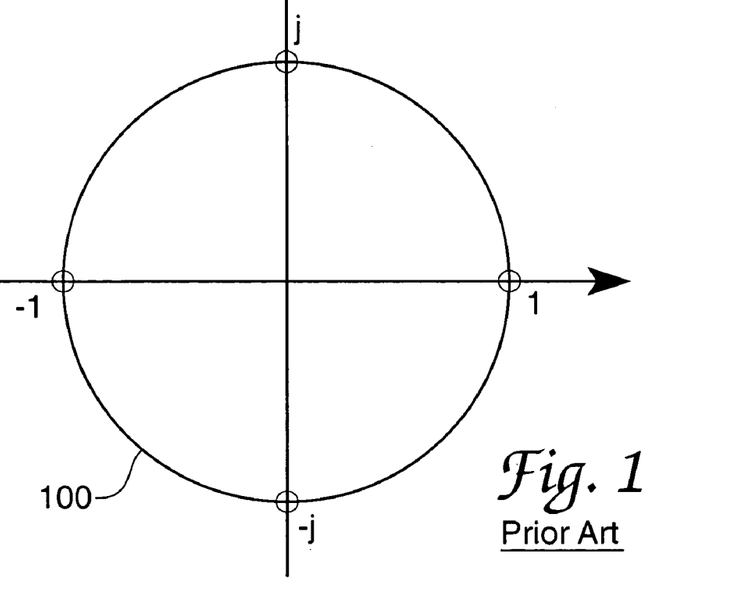
FIG. 1 shows a four point monobit receiver Kernel function approximation.
Figure 2:
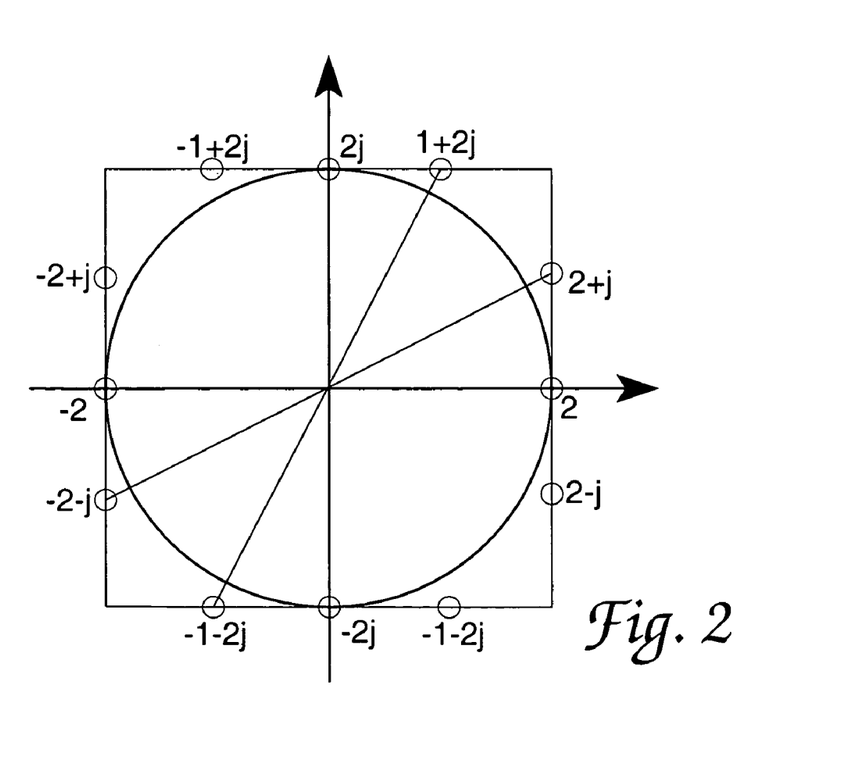
FIG. 2 shows a twelve point Kernel function receiver approximation.

In both the monobit and quadbit receivers, the Kernel function in the Fast Fourier Transform (FFT) is approximated by a few points or values in order to simplify use of the Kernel function. If both the receivers perform a 256 point FFT, theoretically there should be 256 points evenly spaced on a Kernel function circle (or a unit circle plot) in the complex plain. This is because the discrete Fourier transform (DFT) operation can be described as $$X(k) = \sum_{n=0}^{N-1} x(n) e^{-\frac{j2\pi kn}{N}}, \quad (1)$$

where for a 256 point discrete Fourier transform (DFT), N=256 and $$e^{-\frac{j2\pi kn}{N}}$$

is the Kernel function, the function being approximated. Let us refer to the discrete points calculated by this expression as the Kernel points, points which are located on a circle in a complex plane plot. The FIG. 1 drawing demonstrates how the N-point Kernel function can be approximated with four Kernel points. The FIG. 2 drawing shows one of the possible approaches for improving the quadbit receiver by approximating the N-point Kernel function using 12 Kernel points (some of which are on a scaled unit circle and some of which are close by the scaled unit circle). As implied by the FIG. 2 drawing we now find improved results in the form of lower spurious responses in the Fourier transformation occur when the number of Kernel function approximation points is increased and when these points are located in approximately equal angle increments around the origin of the complex plane.

Since all of the twelve FIG. 2 Kernel function approximation points are no longer on the circle but are close to it, we will refer to these points as digitized Kernel points. The selection of the FIG. 2 identified points is made to simplify multiplications in performing the FFT operation. It is apparent that the FIG. 2 values 1 and j do not involve a complicated multiplication operation when used in the equation 1 Fourier transformation because of their unitary magnitudes along the real and imaginary axes. The value 2 appearing in each of the FIG. 2 points however does require an actual multiplication operation in using equation 1. This multiplication need not be regarded as prohibitive for present purposes if it is realized that in the binary number system a multiplication by 2 is equivalent to a left shift of an input binary number by one bit.

As a demonstration of this process we know for example that 3×2=6. In the binary number system the number 3 is represented by 11 (i.e., $1 \times 2^0 + 1 \times 2^1$) and the number 6 is represented by 110 (i.e., $0 \times 2^0 + 1 \times 2^1 + 1 \times 2^2$). Thus, if the 11 representation of a 3 is shifted to the left by one bit and a zero is added, the desired result of a binary 6 is obtained and a multiplication by 2 has been accomplished. This procedure simplifies the multiplication operation called for in using the FIG. 2 Kernel function approximation. Such limited use of the binary shift multiplication algorithm in a multiplication by 2 Kernel function approximation is in fact disclosed in our above-identified U.S. Pat. No. 6,690,315. The U.S. Pat. No. 6,690,315 patent however falls short of recognizing the greater degree to which more complex multiplication by shifting algorithms can be used in achieving approximated Kernel function Fourier transformations. Moreover this shortfall excludes the approximated Kernel function from Kernel function configurations espoused herein. In fact for a limited number of instances and numerical values as are described by the discussion following, this multiplication by shifting is useful in achieving Kernel function approximations according to the present invention.

Additional information regarding bit shifting-accomplished multiplication appears in numerous technical documents. The U.S. Pat. No. 3,730,425 of J. L. Kindell et al. discloses a multiplication arrangement involving the use of bit shifting. Similarly the U.S. Pat. No. 4,064,400 of I. Y. Akushsky et al. discloses a multiplication arrangement involving the use of bit shifting. The references identified in these patents particularly the publication references disclose additional details regarding multiplication accomplished by bit shifting. The multiplication implications of bit shifting are also discussed in textbooks treating the subject of digital computer design, see for example the text "Logical Design of Digital Computers" by Montgomery Phister Jr., John Wiley & Sons, © 1958, page 292 and the text "Digital Computer Fundamentals" by Thomas C. Bartee, McGraw-Hill Incorporated, © 1960, 1966, 1972, page 225. The contents of each of these patents, each patent reference document and each of these texts is hereby incorporated by reference herein.

A point of tangential interest with respect to the FIG. 1 and FIG. 2 and other Kernel function approximations disclosed herein concerns the fact that the absolute magnitude of an approximated or otherwise realized Kernel function is not of significant concern in using equation 1 to achieve a Fourier transformation and an electronic warfare radio receiver. As later appears in the present disclosure, the absolute magnitude of a Kernel function and the diameter of a "unit circle" used to compare approximation Kernel function values, may be based on a unit radius or other radius lengths that are convenient. Similarly a grid pattern used to measure approximation Kernel function location component distances along the real and imaginary axes of a complex plane may be drawn to an absolute measurement scale that is convenient and measurement unit counts from this scale then used in the Kernel function approximation.

Absence of concern with the absolute magnitude of a Kernel function arises from the fact that changes in Kernel function magnitude are of a gain related nature in an implemented Fourier transformation and thus have the mathematical effect of multiplying equation 1 by a numerical constant of differing magnitude. Viewed from a different perspective, such changes in unit circle diameter or grid pattern scale may be considered of insignificant consequence since they influence all terms in equation 1 to an equal degree and are inherently compensated—for in selecting gain factors in an implemented Fourier transformation or a Fourier transformation radio receiver.

The deviation of the Kernel points from a circle and their non-uniform distribution is known to generate undesired spurious responses or erroneous spurs in the output of a Fourier transformation operation. Therefore, it is desirable to include near to Kernel function circle and evenly spaced values in an approximation Kernel function and also to include more digitized Kernel points, points that are uniformly distributed around the unit circle.

Figure 3:
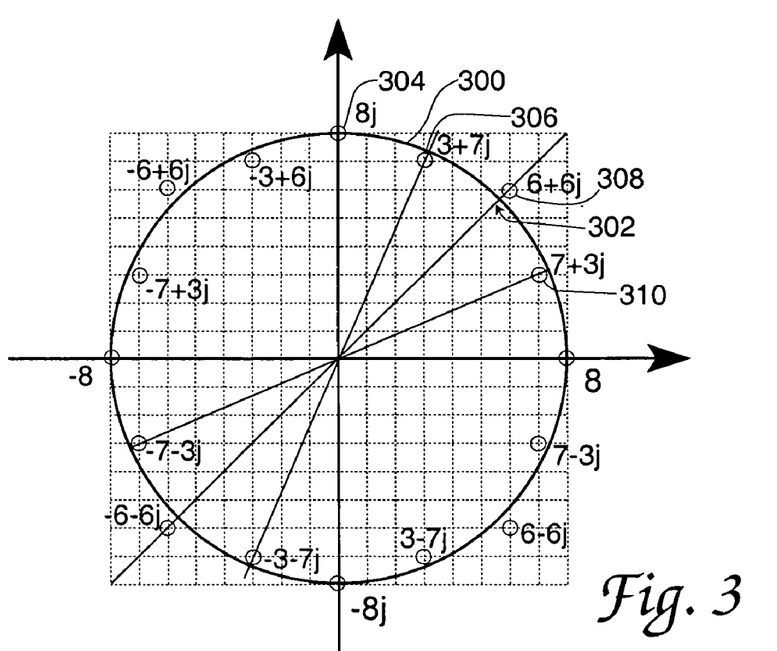
FIG. 3 shows a sixteen point Kernel function receiver approximation.
Figure 4:
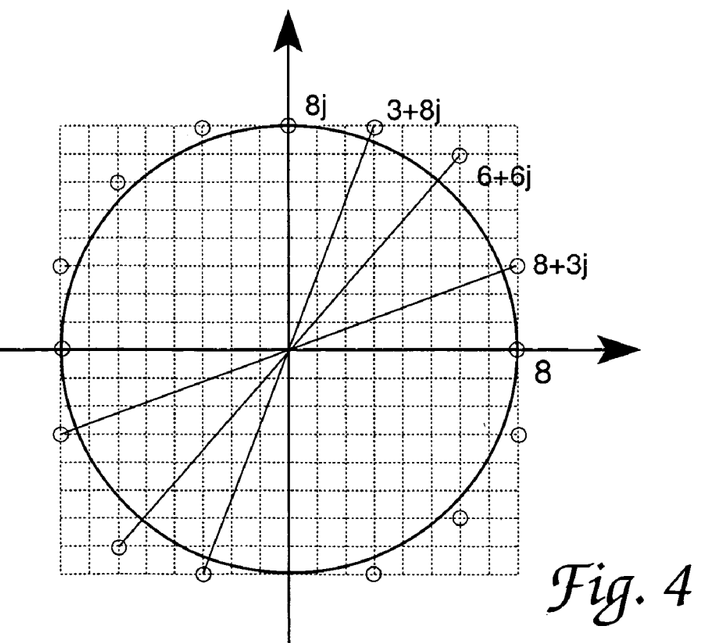
FIG. 4 shows a revised sixteen point Kernel function receiver approximation, a digitized Kernel function receiver approximation.

FIG. 3 in the drawings shows an approximated Kernel function according to this more digitized points and uniformly distributed criteria and represents a 16 digitized Kernel points approximation Kernel function. In the FIG. 3 Kernel function the real axis extends to an arbitrary scale value of 8 and the unit circle is of the same radius. For simplicity, only the angular separations in the first quadrant are shown in FIG. 3 however the 16 digitized Kernel points of the approximation are represented. The four digitized Kernel points in the first quadrant are (8+0j), (3+7j), (6+6j) and (7+3j). Simulation results show the performance of the 16-point Kernel approximation in FIG. 3 is improved over that for the 12 point approximation in FIG. 2.

The FIG. 3 digitized Kernel points require multiplications when employed in equation 1. However these multiplication operations can be accomplished in the relatively simple multiplication by shifting algorithm manner as follows. Let us use a number multiplied by the 7 appearing in several of the FIG. 3 approximation points as an example. For example, 7×3=21. In binary notation, 11 represents 3 and 10101 represents 21. The desired multiplication product result of 10101 or 21 can thus be obtained by left shifting the binary number representing 7 or binary 11 by three positions and then subtracting 11 once (i.e., 11000-11). Of course, a multiplication achieved in this manner requires one operation i.e., the subtraction step, in addition to the shifting step. However the implementation of such a subtraction is easily accomplished, i.e., accomplished much more easily than the multiplication it is assisting in replacing. Similarly, for other examples, if the number 6 or binary 110 is to be multiplied by the number 4 then shifting 110 twice or adding two zeros gives 11000 or 24. Moreover if the number 5 or 101 is to be multiplied by the number 5 then shifting twice gives 10100 and adding 101 gives 11001 or 25 as needed.

Also if the number 3 is to be multiplied by the number 4 (i.e., by 2 then the result by two again) the result is the number 12, which can be represented in binary form by 1100. Thus this operation can also be achieved by shifting—i.e., by shifting the binary bits for the input number 3 leftward by two positions.

In order to simplify use of the FIG. 3 Kernel function approximation even more it is possible to adjust the location of several of the illustrated Kernel points by a minor amount in a further deference to an easy utilization of the approximation. For example the FIG. 3 points at (7+3j) and (3+7j) may be replaced by nearby points at (8+3j) and (3+8j) without introducing significantly greater separations between the approximation points and the FIG. 3 circle; this is shown in the FIG. 4 drawing. In binary, multiplication by 8 is a more simplified operation than multiplication by 7 since it requires only a shift left by three bit positions and no addition or subtraction step. The (7+3j) point for example may also be referred-to as the point (7,3) in a shortened form of notation as is used in Table 1 and some later paragraphs herein.

As part of the present invention therefore we espouse as guidelines for selecting the Kernel function circle diameter, the Kernel function grid scale and the preferred Kernel point locations the following general principles:

a Kernel function circle radius that is expressible as a power of two along an arbitrary measurement scale, a radius such as 1, 2, 4, 8, 16 etc. . . . ;

the x and y parts of each digitized Kernel point i.e., the measurements along the real and imaginary axes in FIG. 1 through FIG. 4, are of decomposable integral values that allow simple shift and add multiplication operations to be employed;

the Kernel function circle is divided into angular parts such that the maximum angle of any part is minimized and as much symmetry is maintained in the part locations as possible;

a simulation Kernel point can be replaced with a point having a nearby more conveniently processed integer number.

The closer the digitized Kernel points are located to the actual Kernel points, the lower the spurious response experienced from the approximation Kernel function Fourier transformation.

Figure 5:
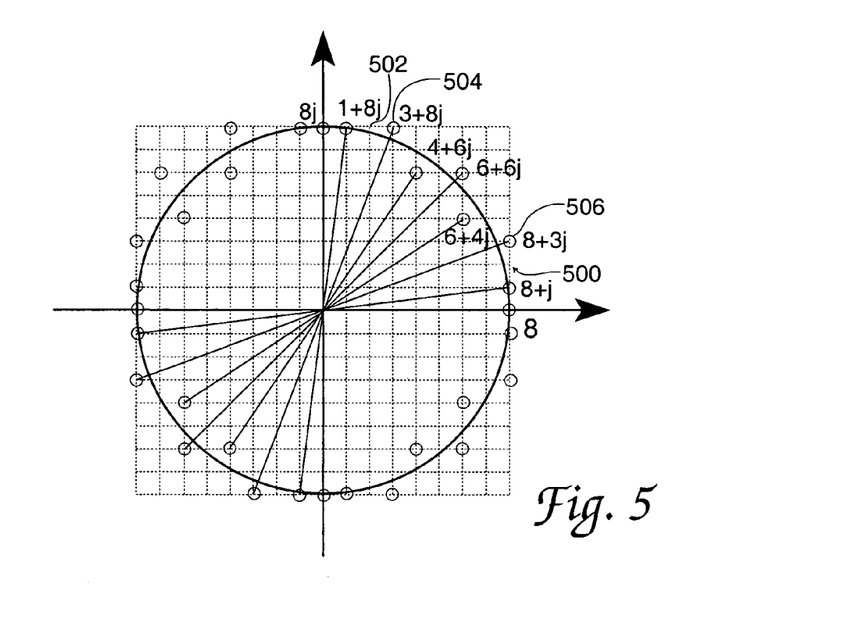
FIG. 5 shows a thirty two point digitized Kernel function receiver approximation.

For the ideal Kernel function simulation case where the digitized points approach the actual FFT or Digital Fourier Transformation (DFT) Kernel points in number and location, all of the digitized Kernel points will lie on the circle and there will be N identical angular divisions each separated by an angle of $2\pi/N$ radians. As an example of point replacement, a Kernel point can be replaced by a close-by point such as the replacing the circle-located point that should appear at 302 in FIG. 3 with the indicated nearby point (6+6j) in both FIGS. 3 and 4. The point 308 located at 6+6j in FIG. 3 and the other indicated points at 304, 306 and 310 are digitized Kernel points. It is desired to locate these points as close to the circle 300 as is possible for obtaining low output spurious responses in the Fourier transformation. FIG. 5 in the drawings shows a 32 digitized Kernel points approximation according to these guidelines and having a radius of 8 arbitrary units.

Increasing the radius of the FIG. 5 circle from 8 to 16 arbitrary units can improve the resolution of the digitized Kernel points. As a result, the FIG. 3 digitized approximation Kernel points can be placed closer to the actual Kernel points on the circle 300. However, this Kernel function approximation increases the number of operations required in using the approximation Kernel function in equation 1 and the number of bits required for equation 1 implementation. Additionally, intermediate digitized Kernel points may be substituted for points in the FIG. 5 array without significant change of the worst-case range of the spurious response (i.e., without significant amplitude change to the largest or worst case spur in the related frequency domain plot). For example in FIG. 5 we may substitute the intermediate point at 500 or (8+2j) and the point at 502 or (2+8j) in the Kernel function approximation. While such points do not improve the spurious response range, they do reduce the hardware required for Kernel function implementation. With the substitution of these points 500 and 502, the nearby (8+3j) and (3+8j) digitized Kernel points at 504 and 506 can be implemented using less hardware. The location of desired and less desirable Kernel function points adjacent the circle 300 in FIG. 3 and in the other drawings herein may be thought of as defining an annular region that is adjacent to and inclusive of the circles 300.

Figure 6A:
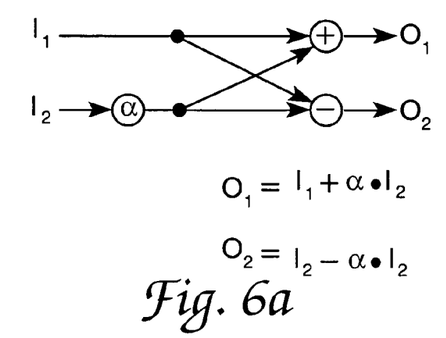
FIG. 6a shows a flow graph for a basic two-point butterfly computation for a digital Fourier transformation.

FIG. 6a in the drawings shows a flow graph for a basic two-point butterfly computation for a digital Fourier transformation. The use of butterfly symbology to describe a process for computing a discrete Fourier transform or an inverse Fourier transformation is believed to now be well known in the electronic art. Definitions, use details and examples of lesser and greater complexity than the Fourier transformations used in the present invention are to be found in numerous text book and journal article publications including for example the text "Digital Signal Processing" authored by Alan V. Oppenheim and Ronald W. Schafer, Prentice-Hall Inc. Englewood Cliffs, N.J., 1975. The contents of this text are hereby incorporated by reference herein. Chapter 6 of the Oppenheim and Schafer text and the material near page 297 are particularly in point with respect to the drawings of FIG. 6 through FIG. 8 in the present document and the butterfly representations therein.

Figure 6B:
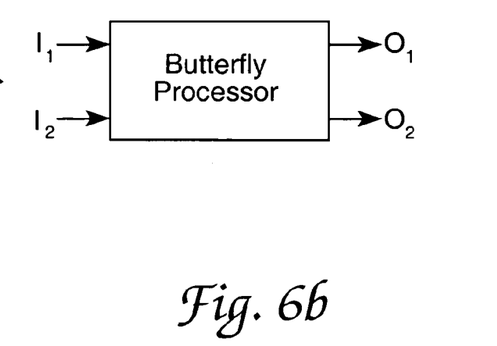
FIG. 6b shows a symbolic repetition for the FIG. 6a basic butterfly processor for a digital Fourier transformation.

FIG. 6a in the drawings thus shows a butterfly processing unit that is a basic building block of the present Fourier transformation. Each butterfly as shown in FIG. 6a includes two complex inputs, $I_1$ and $I_2$, and two complex outputs $O_1$, and $O_2$. The second of the complex inputs, $I_2$, is multiplied by a factor, $\alpha$, that is a point in the complex plane representing the result or output of the complex Kernel function. In FIG. 6a, the exact Kernel function output, $\alpha$, is replaced by the digitized Kernel function points discussed above. FIG. 6b shows a simplified symbolic repetition for the FIG. 6a basic butterfly processor.

Figure 7:
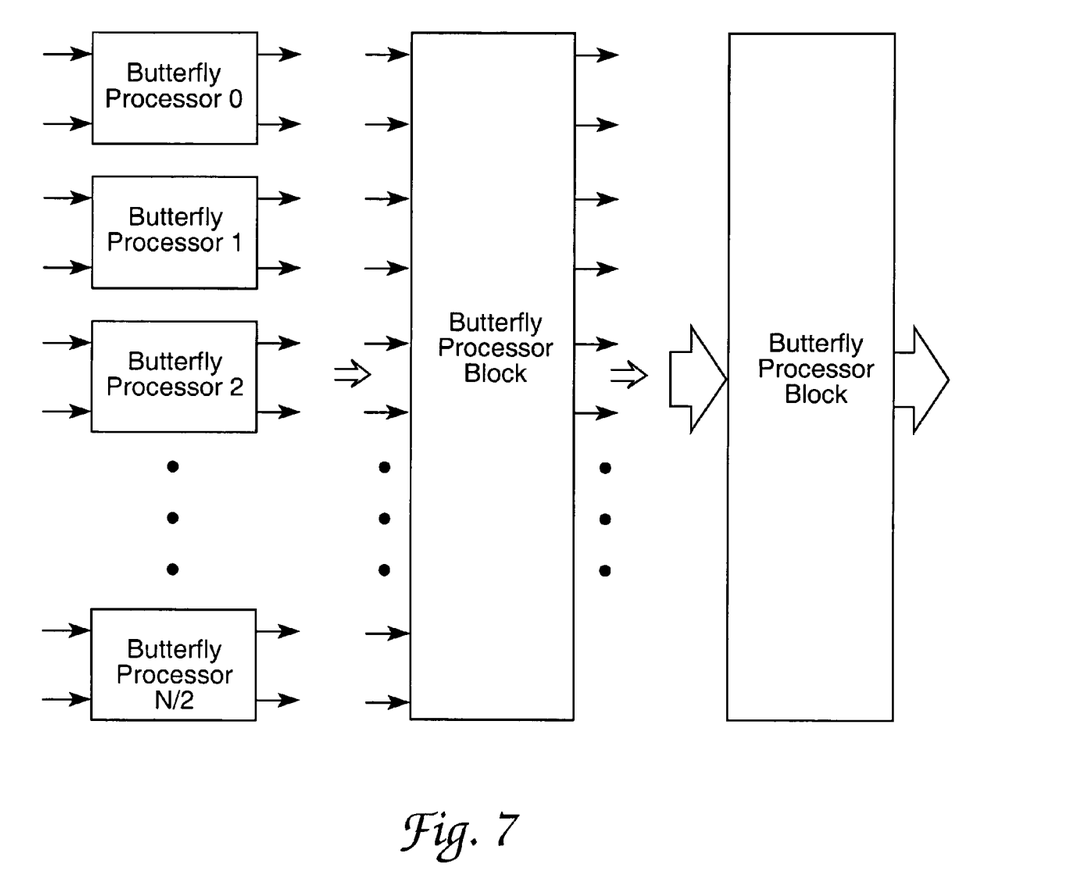
FIG. 7 shows a combination of butterfly processors into a processing block or level.
Figure 8:
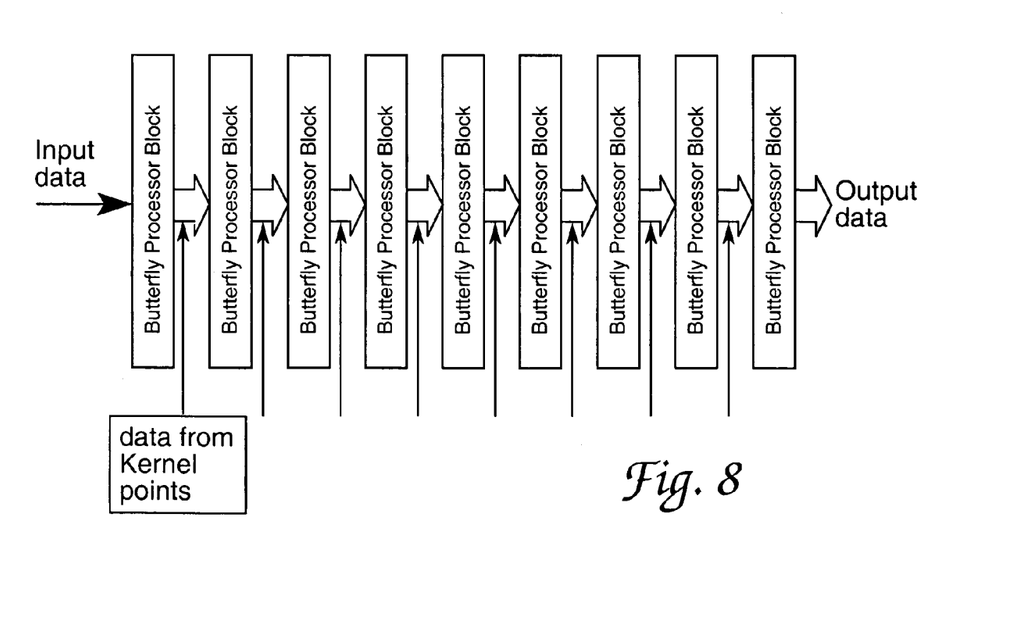
FIG. 8 shows a Fourier transformation processor in butterfly form.

In the drawing of FIG. 7 herein, a total of N/2 butterfly processors are combined to form a processing block or level. Each FIG. 7 block or level has 2*N/2=N complex inputs and outputs. FIG. 8 in the drawings shows the combination of FIG. 7 blocks or levels to form a 256 point FFT as is desired in the described embodiments of the present invention. For an N=256 or ($2^8$) point IFFT, there are 8 levels of FFT blocks as are represented from left to right in the FIG. 8 drawing, and each block contains N/2=128 butterflies. In each of these butterflies, the complex multiplication is replaced by the digitized or approximate Kernel points as discussed above.

A person originating an electronic warfare radio receiver can select among different digitized Kernel functions as the receiver operating speed allows. The improvement in component operating speed can allow better digitized Kernel points, which in turn improves the instantaneous dynamic range of the receiver.

Simulated results for an electronic warfare receiver incurring two input signals, one strong and one weak using a differing number of Kernel function approximation points are disclosed in the following Table 1. The analog-to-digital converter used in the Table 1 receiver is assumed to have a 6 bits capacity. The instantaneous dynamic range, IDR, and locations of the digitized Kernel points in the first quadrant (of the employed four quadrants) are listed in the second and third columns of the table. The successively larger IDR values are of notable interest in the Table 1 data.

TABLE 1

| No. Of digitized Kernel points | IDR (dB) | Locations of digitized Kernel points in first quadrant |
| --- | --- | --- |
| 4 | 1.78 | (1,0), (j,0) |
| 12 | 11.57 | (2,0), (2,j), (1,2j), (0,2j) |
| 16 | 18.65 | (8,0), (8,3j), (6,6j), (3,8j), (0,8j) |
| 24 | 18.69 | (4,0), (4,j), (4,2j), (3,3j), (2,4j), (1,4j), (0,4j) |
| 32 | 21.77 | (8,0), (8,j), (8,3j), (6,4j), (6,6j), (4,6j), (3,8j), (1,8j), (0,8j) |
| 256 | 30.05 | 256 points on unit circle |

For each data point in Table 1, 400,000 samples were used. Each sample consists of two signals with different amplitudes, random frequencies, and random phases. From these simulated results it is clearly discernable that more digitized Kernel points achieve better instantaneous dynamic range. It should be noted that our method is not limited by the number of points in the digitized Kernel implementation. Depending on hardware availability, available integrated circuit chip area, or technology improvements, we can increase the size and number of points in our approximation until we reach the ideal case (DFT equivalence) in accordance with the present invention. When an analog-to-digital converter of greater bit capacity is used, the instantaneous dynamic range characteristic of the receiver are greater than the values listed in Table 1.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. The limited mechanization complexity method of analyzing input radio frequency signals in a radio receiver, said method comprising the steps of:

generating an approximated Kernel function Fourier transformation of successive segments of said radio receiver input radio frequency signals;

said approximated Kernel function Fourier transformation segments including individual Fourier series terms having real magnitude and imaginary magnitude coefficients generated by multiplication of said radio frequency radio receiver input signal determined coefficients by selected approximated Fourier transformation Kernel function coefficients;

said selected approximated Kernel function Fourier transformation coefficients including both integral unit and integral multiple unit possible component magnitudes lying within and external of a Kernel function circle over a real and imaginary value complex plane grid containing said magnitude circle Kernel function location pattern over said real and imaginary value complex plane grid;

said selected approximated Kernel function Fourier transformation Kernel function locations being dispersed in substantially equal angular increments around said Kernel function magnitude circle location pattern on said real and imaginary value complex plane grid;

generating said individual Fourier series terms from said radio receiver input signal determined coefficients and from said Fourier transformation Kernel function coefficients having real magnitude and imaginary magnitude coefficients using a bit shift multiplication algorithm inclusive of multiple shift and add/subtract algorithm components;

said selected approximated Fourier transformation Kernel function locations being dispersed in an annular space inclusive of said Kernel function magnitude circle on said real and imaginary value complex plane grid and being optimized with respect to including integral numeric values compatible with said bit shift multiplication algorithm having multiple shift and add/subtract algorithm components;

whereby enhanced multiple radio frequency signal dynamic range and simplified kernel function implementation characteristics are provided in said radio frequency radio receiver.

2. The limited mechanization complexity method of analyzing input radio frequency signals in a radio receiver of claim 1 wherein said selected approximated Fourier transformation Kernel function locations are also optimized with respect to generation of minimal spurious responses in said Fourier transformation.

3. The limited mechanization complexity method of analyzing input radio frequency signals in a radio receiver of claim 1 wherein said selected approximated Fourier transformation Kernel function location complex plane grid includes grid dimensions of arbitrary and undefined unit magnitudes.

4. The limited mechanization complexity method of analyzing input radio frequency signals in a radio receiver of claim 1 wherein said method of analyzing comprises determining input signal component frequency and component amplitude contents of radio frequency input signals of an electronic warfare radio receiver.

5. The limited complexity method of analyzing input radio frequency signals in a radio receiver of claim 1 wherein said input radio frequency signals are two in number and are of five decibels difference in signal strength.

6. The limited complexity method of analyzing input radio frequency signals in a radio receiver of claim 1 wherein said input radio frequency signals are two in number and are of ten decibels difference in signal strength.

7. The limited complexity method of analyzing input radio frequency signals in a radio receiver of claim 1 wherein said selected approximated Fourier transformation Kernel function locations are between thirty two and two hundred fifty six in number.

8. The limited complexity method of analyzing input radio frequency signals in a radio receiver of claim 1 wherein said selected approximated Fourier transformation Kernel function locations are equally and symmetrically disposed in four quadrants of said complex plane grid.

9. Approximated Kernel function utilizing radio receiver apparatus comprising the steps of:
a source of said radio receiver connected multiple frequency microwave radio frequency signals to be evaluated for signal component characteristics;
an implemented Fourier transformation algorithm connected with said source of multiple frequency microwave radio frequency signals;

said implemented Fourier transformation algorithm in said radio receiver including a selected plurality of approximated Fourier transformation Kernel function locations, disposed within a complex plane plot of real and imaginary values, having selected integral unit real and imaginary component magnitudes and identifying locations received within an annular arc of selected greater than zero radial thickness overlying said plot of real" and imaginary values;

said implemented Fourier transformation algorithm in said radio receiver including a bit shift multiplication realization, of shift, multiple shift and multiple shift plus a selected one of addition and subtraction characterization, executing simplified multiplication operations involving real and imaginary coordinate magnitudes of said Kernel function locations in said approximated Fourier transformation;

said selected approximated Fourier transformation Kernel function location coordinate magnitudes being elected to generate minimal spurious responses in an output signal of said implemented Fourier transformation algorithm and said radio receiver;

said bit shift multiplication realization of multiple shift and multiple shift plus a selected one of addition and subtraction characterization, also being optimized, in shift, multiple shift and multiple shift plus a selected one of addition and subtraction realization complexity, by said selected approximated Fourier transformation Kernel function location coordinate magnitudes;

whereby simplified kernel function implementation and enhanced multiple signal dynamic range characteristics are available in said radio receiver.

10. The approximated Kernel function utilizing radio receiver apparatus of claim 9 wherein said apparatus comprises an electronic warfare microwave radio frequency radio receiver.

11. The approximated Kernel function utilizing radio receiver apparatus of claim 9 wherein said source of multiple frequency signals comprises radio frequency signals of two differing operating frequencies.

12. The approximated Kernel function utilizing radio receiver apparatus of claim 9 wherein said selected plurality of approximated Fourier transformation Kernel function locations disposed within a complex plane plot of real and imaginary values received within an annular arc of selected radial thickness overlying said plot of real and imaginary values are disposed in a closed circular annular arc.

13. The approximated Kernel function utilizing radio receiver apparatus of claim 9 wherein said wherein said input radio frequency signals are at least two in number and are of at least five decibels difference in signal strength.

14. The approximated Kernel function utilizing radio receiver apparatus of claim 9 wherein said implemented Fourier transformation algorithm in said radio receiver selected approximated Fourier transformation Kernel function locations are also optimized with respect to one of generation of minimal spurious responses and selected multiple signal dynamic range characteristics in said Fourier transformation.

15. The approximated Kernel function utilizing radio receiver apparatus of claim 9 wherein said complex plane plot of real and imaginary values includes coordinate lengths of 1, 2, 4, 8, 16 and so-on units magnitude.

16. The approximated Kernel function utilizing radio receiver apparatus of claim 9 wherein said complex plane plot of real and imaginary values is comprised of integral lengths, along said real and imaginary axes, enabling algorithm implementation with simple shift and add multiplication operations.

17. The approximated Kernel function utilizing radio receiver apparatus of claim 9 wherein said complex plane plot of real and imaginary values is comprised of integral lengths along said real and imaginary axes defining substantial angular symmetry of Kernel function locations about an origin of said complex plane plot.

18. The approximated digitized Fourier transformation Kernel function utilizing radio receiver comprising:

digitized approximated Kernel function value locations disposed adjacent a Kernel function map circle of said radio receiver;

said Kernel function map circle being of radius dimension expressible as a power of two units along an arbitrary measurement scale, a radius dimension having a length from the numerical series of 1, 2, 4, 8, 16 and so-on units along said arbitrary measurement scale of said radio receiver;

shift and add multiplication-susceptible integral unit lengths for each real and imaginary component of digitized Kernel function points in said radio receiver Kernel function map;

substantially symmetrical digitized Kernel function point angular locations around said Kernel function map circle;

digitized Kernel function point locations adjacent said radio receiver Kernel function map circle being substantially optimized for shift multiplication algorithm implementation; and digitized Kernel function point locations adjacent said radio receiver Kernel function map circle being substantially optimized for minimal approximation Kernel function spurious response generation with respect to adjacent possible approximation Kernel function locations;

whereby simplified kernel function realization and enhanced multiple signal dynamic range with limited spurious response characteristics are provided in said radio receiver.

* * * * *